US010219224B2

(12) United States Patent
Wong et al.

(10) Patent No.: US 10,219,224 B2
(45) Date of Patent: Feb. 26, 2019

(54) WLAN SYSTEM WITH OPPORTUNISTIC TRANSITIONING TO A LOW POWER STATE FOR POWER MANAGEMENT

(71) Applicant: Apple Inc., Cupertino, CA (US)

(72) Inventors: Chiu Ngok E. Wong, San Jose, CA (US); Christiaan A. Hartman, San Jose, CA (US); Joonsuk Kim, Saratoga, CA (US); Syed Aon Mujtaba, Santa Clara, CA (US); Yong Liu, Campbell, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/028,659

(22) Filed: Jul. 6, 2018

(65) Prior Publication Data
US 2018/0317178 A1  Nov. 1, 2018

Related U.S. Application Data

(63) Continuation of application No. 15/418,854, filed on Jan. 30, 2017, now Pat. No. 10,021,650, which is a
(Continued)

(51) Int. Cl.
*H04W 52/02* (2009.01)
*H04L 29/06* (2006.01)
(Continued)

(52) U.S. Cl.
CPC ....... *H04W 52/0274* (2013.01); *H04L 1/0003* (2013.01); *H04L 49/201* (2013.01);
(Continued)

(58) Field of Classification Search
CPC ........... H04W 52/0274; H04W 40/005; H04W 40/244; H04W 52/0209; H04W 52/0225;
(Continued)

(56) References Cited

U.S. PATENT DOCUMENTS

| 7,570,610 B2 | 8/2009 | Chen |
| 2005/0068934 A1 | 3/2005 | Sakoda |

(Continued)

FOREIGN PATENT DOCUMENTS

| CN | 103096419 A | 5/2013 |
| CN | 103298064 A | 9/2013 |

(Continued)

OTHER PUBLICATIONS

Extended Search Report, European Application No. 15169425.4, dated Nov. 10, 2015, 5 pages.
(Continued)

*Primary Examiner* — Duc C Ho
(74) *Attorney, Agent, or Firm* — Meyertons Hood Kivlin Kowert & Goetzel, P.C.; Jeffrey C. Hood; Matthew C. Washburn

(57) ABSTRACT

Embodiments described herein relate to providing reduced power consumption in wireless communication systems, such as 802.11 WLAN systems. Timing information regarding power save opportunities (PSOPs) may be provided in communication frames, which may inform mobile devices of expected frame exchange periods during which they may transition to a Doze state. Additional PSOP information may be included in beacon frames, which may inform mobile devices of expected multicast periods during which they may transition to a Doze state. This may operate to provide improvements in terms of power consumption.

20 Claims, 14 Drawing Sheets

Related U.S. Application Data continuation of application No. 14/721,374, filed on May 26, 2015, now Pat. No. 9,572,105.

(60) Provisional application No. 62/020,195, filed on Jul. 2, 2014, provisional application No. 62/015,326, filed on Jun. 20, 2014.

(51) Int. Cl.
  *H04L 1/00*     (2006.01)
  *H04W 40/24*    (2009.01)
  *H04W 40/00*    (2009.01)
  *H04L 12/931*   (2013.01)
  *H04W 88/02*    (2009.01)
  *H04W 84/12*    (2009.01)
  *H04L 29/08*    (2006.01)

(52) U.S. Cl.
  CPC ........... *H04L 69/22* (2013.01); *H04W 40/005* (2013.01); *H04W 40/244* (2013.01); *H04W 52/0209* (2013.01); *H04W 52/0225* (2013.01); *H04L 69/323* (2013.01); *H04W 84/12* (2013.01); *H04W 88/02* (2013.01); *Y02D 70/00* (2018.01); *Y02D 70/1222* (2018.01); *Y02D 70/1262* (2018.01); *Y02D 70/142* (2018.01); *Y02D 70/144* (2018.01); *Y02D 70/26* (2018.01)

(58) Field of Classification Search
  CPC .... H04W 84/12; H04W 88/02; H04L 1/0003; H04L 49/201; H04L 69/22; H04L 69/323; Y02D 70/1222; Y02D 70/26; Y02D 70/142; Y02D 70/00; Y02D 70/1262; Y02D 70/144
  See application file for complete search history.

(56) References Cited

U.S. PATENT DOCUMENTS

| | | |
|---|---|---|
| 2006/0285528 A1 | 12/2006 | Gao et al. |
| 2007/0047482 A1 | 3/2007 | Costa et al. |
| 2007/0165593 A1 | 7/2007 | Hundal |
| 2008/0049703 A1* | 2/2008 | Kneckt .................. H04W 68/00 370/342 |
| 2008/0219196 A1* | 9/2008 | Ptasinski ............... H04W 52/02 370/311 |
| 2010/0103955 A1 | 4/2010 | Biederman |
| 2010/0189021 A1 | 7/2010 | He |
| 2013/0155905 A1 | 6/2013 | Sampath |
| 2013/0235720 A1* | 9/2013 | Wang ................. H04W 28/0278 370/229 |
| 2014/0071870 A1 | 3/2014 | Abraham et al. |
| 2014/0086134 A1* | 3/2014 | Smadi ................... H04W 84/12 370/312 |
| 2014/0185506 A1 | 7/2014 | Yang |
| 2014/0307601 A1 | 10/2014 | Viswanadham et al. |
| 2014/0314054 A1 | 10/2014 | Seok |
| 2015/0036575 A1 | 2/2015 | Li |
| 2015/0382283 A1 | 12/2015 | Wang et al. |
| 2016/0014773 A1 | 1/2016 | Seok |

FOREIGN PATENT DOCUMENTS

| | | |
|---|---|---|
| WO | 2013137824 | 9/2013 |
| WO | 2014013430 | 1/2014 |

OTHER PUBLICATIONS

Office Action, Chinese Application for Invention No. 201510288753.1, dated Feb. 26, 2018, 15 pages.

\* cited by examiner

| | 11g (bits) | 11n (bits) | 11ac (bits) |
|---|---|---|---|
| LENGTH field in PHY SIG (octets) | 4,095 (12) | 65,535 (16) | 4,692,480 (22.16) |
| PPDU Duration (ms) | 5.48 @ 6 Mb/s | 10 | 5.484 |
| Duration field in MAC (ms) | | 65.53 (16) | |
| TXOP in MAC (ms) | | 8.192 (8 bits in steps of 32us) | |
| Service Period in MAC (MSDU / A-MSDU) | | Max SP Length (2, 4, 6) | |
| PSOP based on maximum PPDU Duration (ms) | up to 87.68 | up to 160 | up to 87.74 |

FIG. 4

WLAN SYSTEM WITH OPPORTUNISTIC TRANSITIONING TO A LOW POWER STATE FOR POWER MANAGEMENT

PRIORITY INFORMATION

This application is a continuation of U.S. patent application Ser. No. 15/418,854, entitled "WLAN System with Opportunistic Transitioning to a Low Power State for Power Management," by Chiu Ngok E. Wong et al., filed Jan. 30, 2017, issued as U.S. Pat. No. 10,021,650, which is a continuation of U.S. patent application Ser. No. 14/721,374, entitled "WLAN System with Opportunistic Transitioning to a Low Power State for Power Management," by Chiu Ngok E. Wong et al., filed May 26, 2015, issued as U.S. Pat. No. 9,572,105, and which claims priority to U.S. Provisional Patent Application Ser. No. 62/020,195, having the same title, filed Jul. 2, 2014, and U.S. Provisional Patent Application Ser. No. 62/015,326, having the same title, filed Jun. 20, 2014, all of which are hereby incorporated by reference as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, including to power management in 802.11 Wireless LAN systems.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most moderns WLANs are based on the IEEE 802.11 standard and are marketed under the Wi-Fi brand name. WLAN networks link one or more devices to a wireless access point, which in turn provides connectivity to the wider Internet.

In 802.11 systems, devices that wirelessly connect to each other are referred to as "stations" or STAs for short. Wireless stations can be either wireless access points or clients. Access points (APs), also referred to as wireless routers, act as base stations for the wireless network. APs transmit and receive radio frequency signals for communication with wireless client devices. APs also typically couple to the Internet in a wired fashion. Wireless clients operating on an 802.11 network can be any of various devices such as laptops, tablet devices, smart phones, or fixed devices such as desktop computers. Wireless client devices are referred to herein as stations, STA devices, or simply as "STA".

Since in most instances the devices communicating on a WLAN are mobile, battery-operated devices, power management is an important consideration. The IEEE 802.11 standard defines two Power Management (PM) modes for a STA, these being Active Mode (AM) and Power Save mode (PS). The STA in Active mode is always in an Awake state, and the AP may send frames to this STA at any time. The STA in PS mode may be in an Awake or Doze state. When the STA is in the Doze state, the AP buffers frames for this STA to be delivered the next time the STA enters the Awake state. The STA can notify the AP that it is in the Awake state with a PS-Poll or trigger frame.

IEEE 802.11e introduced new power save delivery and notification mechanisms. APSD (automatic power save delivery) provides two ways to start delivery: 'scheduled APSD' (S-APSD) and 'unscheduled APSD' (U-APSD). With APSD, multiple frames may be transmitted together by the access point to a power-saving device during a service period. After the end of a service period, the device enters a Doze state until next service period. With S-APSD, service periods start according to a predetermined schedule known to the power-saving device, thus allowing the Access Point to transmit its buffered traffic without the need for any signaling. With U-APSD, whenever a frame is sent to the Access Point, a service period is triggered, which allows the access point to send buffered frames in the other direction. U-APSD can take a 'full' U-APSD or 'hybrid' U-APSD form. With Full U-APSD, all types of frames use U-APSD independently of their priority. With Hybrid U-APSD, either U-APSD or the legacy Power Save Polling mechanism is used, depending on the access category. S-APSD is available for both channel access mechanisms (Enhanced Distributed Channel Access (EDCA) and Hybrid Coordinated Function (HCF) Controlled Channel Access (HCCA)), while U-APSD is available only for EDCA.

IEEE 802.11 defines periods of time where a STA has the right to use a channel and initiate frame exchange sequences. These periods of time may be dynamic, negotiated, scheduled or unscheduled. Examples of such periods include transmission opportunities (TXOP), service periods (SP), Delivery Traffic Indication Map (DTIM) multicast delivery, etc. For example, during U-APSD, an SP begins with a trigger frame, and ends with a frame in which the End of Service Period (ESOP) subfield bit in the Media Access Control (MAC) header Frame Control (FC) field set to 1.

Therefore, improvements are desired in wireless communication systems. In particular, it would be desirable to provide improvements with respect to reduced power consumption and/or reduced latency in WLAN systems.

SUMMARY

Embodiments described herein relate to providing reduced power consumption in wireless communication systems, such as 802.11 WLAN systems. Timing information regarding power save opportunities (PSOPs) may be provided in communication frames, which may inform mobile devices (STAs) of expected frame exchange periods during which they may transition to a Doze state. This may operate to provide improvements in terms of power consumption.

In some embodiments described herein, a mobile device may detect a communication packet on a wireless communication channel, wherein the communication packet is not addressed to the mobile device, wherein the communication packet comprises timing information indicating a period of time during which the wireless communication channel is predicted to be busy. The mobile device may enter a Doze state for the duration of the indicated period of time, wherein the entering the Doze state is based at least partly on the timing information.

In some embodiments, the communication packet may comprise a physical layer (PHY) header, wherein the PHY header comprises the timing information.

In some embodiments, the timing information may comprise information indicating a duration of the communication packet; and a multiplier representing a quotient of the indicated period of time divided by the duration of the communication packet. In some such embodiments, the information indicating the duration of the packet may comprise a modulation and coding scheme (MCS) field and a length field indicating a length of the communication packet, wherein the MCS field, the length field, and the multiplier may be included in a physical layer (PHY) header of the communication packet.

In some embodiments, the mobile device may determine that the mobile device has no data to send prior to the end of the indicated period of time, wherein the entering the Doze state is further in response to the determining.

In some embodiments, the mobile device may initiate a service period with an access point, wherein the communication packet may be addressed to the access point from another mobile device, wherein the detecting the communication packet may occur during the service period, and wherein the entering the Doze state may occur without the mobile device receiving an indicator from the access point that the service period is terminated. In some such embodiments, the mobile device may determine that the service period has ended, based on the detecting the communication packet occurring during the service period, wherein the entering the Doze state may be in response to the determining that the service period has ended.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

FIG. 4 illustrates example power save opportunity (PSOP) durations for certain configurations of three different 802.11 standards;

Figure 1:
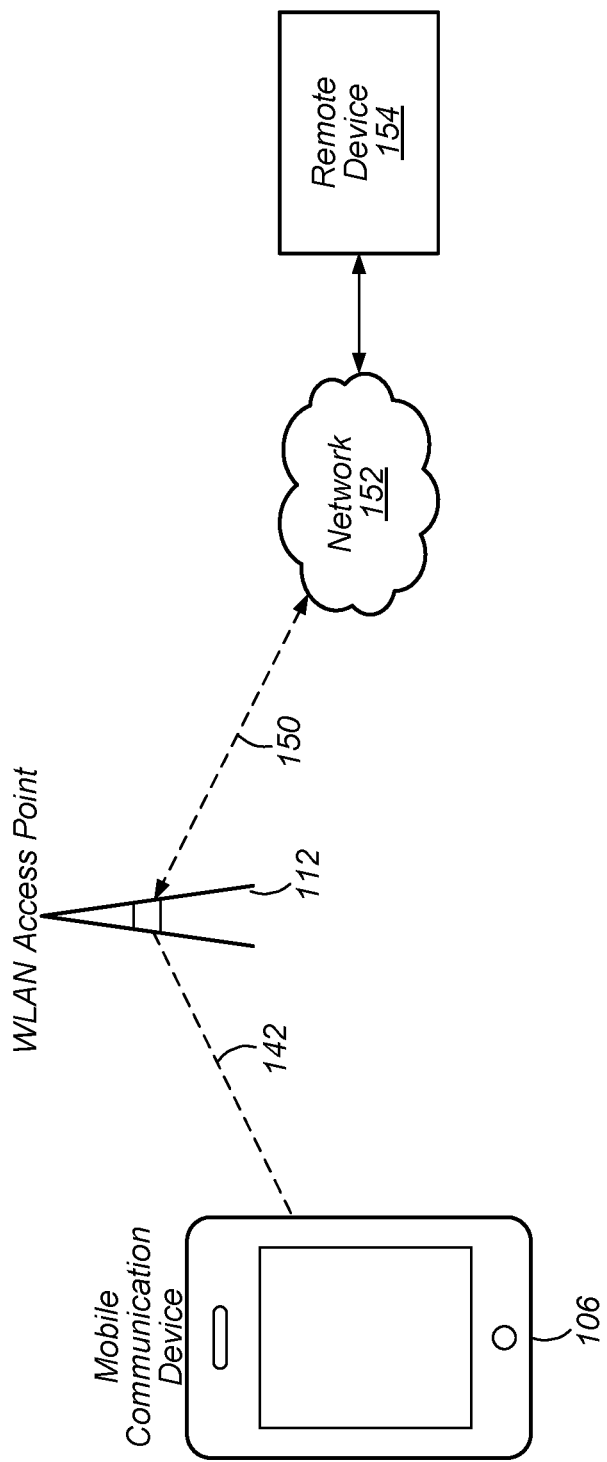
FIG. 1 illustrates an example WLAN communication system, according to embodiments.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Incorporation by Reference

This application claims priority to U.S. Provisional Application No. 62/015,326, titled "WLAN System with Opportunistic Transitioning to a Low Power State for Power Management", filed Jun. 20, 2014, and to U.S. Provisional Application No. 62/020,195, having the same title, filed Jul. 2, 2014, both of which are hereby incorporated by reference in their entirety as though fully and completely set forth herein.

Acronyms

The following acronyms are used in the present disclosure.

AID: Association Identifier
AM: Active Mode
AP: Access Point
BU: Bufferable Unit
DTIM: Delivery Traffic Indication Map
ESOP: End of Service Period
FC: Frame Control
FCS: Frame Check Sequence
MAC: Media Access Control
MCS: Modulation and Coding Set
PLCP: PHY Layer Convergence Procedure
PPDU: PLCP Protocol Data Unit
PM: Power Management
PS: Power Save Mode
PSOP: Power Save Opportunity
RAT: Radio Access Technology
RX: Receive
S-APSD: Scheduled Automatic Power Save Delivery
STA: Station device, such as a client mobile device
TSF: Timing Synchronization Function
TX: Transmit
U-APSD: Unscheduled Automatic Power Save Delivery
WLAN: Wireless Local Area Network

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—WLAN System

FIG. 1 illustrates an example WLAN system according to some embodiments. As shown, the exemplary WLAN system includes a mobile device 106 communicating over a wireless communication channel 142 with an Access Point (AP) 112. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152.

The WLAN system may, e.g., be configured to operate according to any of various communications standards, such as the various IEEE 802.11 standards.

The embodiments described herein may be implemented within the WLAN system of FIG. 1. For example, one or more of the mobile device 106 and the AP 112 may be configured to implement part or all of the methods described herein, e.g., for reduced power consumption and/or latency in communications between the mobile device 106 and the AP 112.

Figure 2:
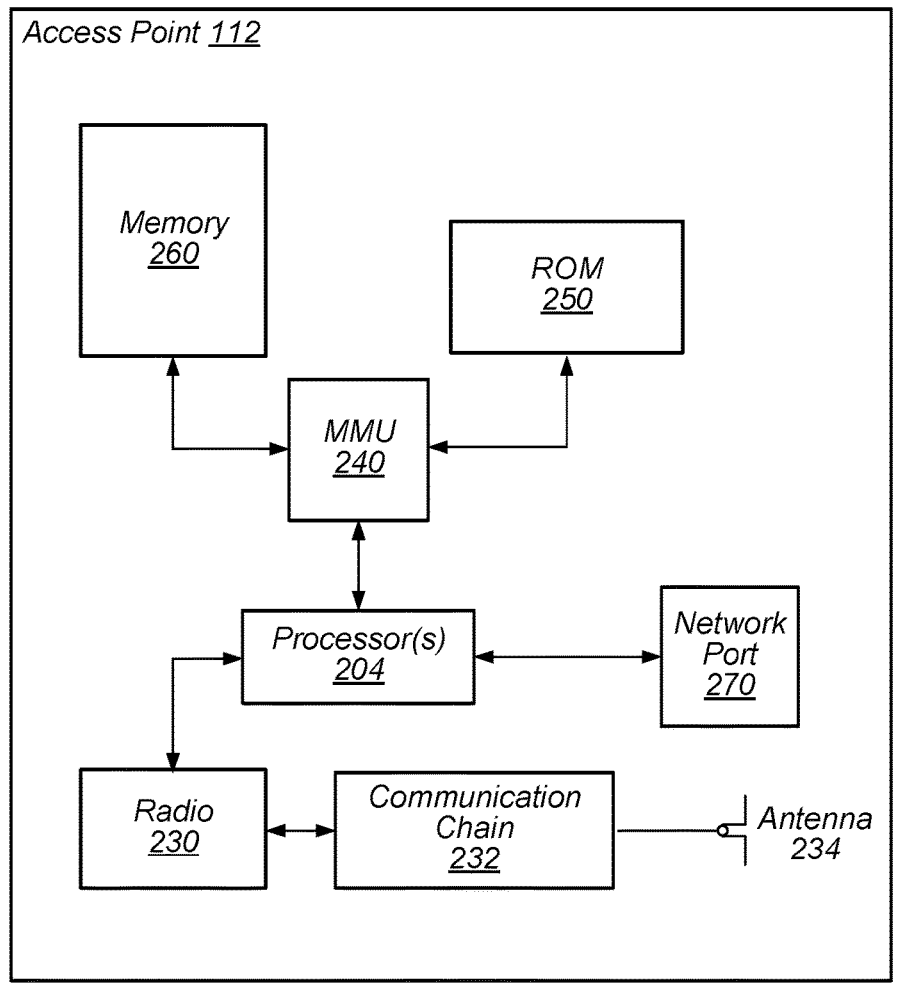
FIG. 2 is an example block diagram of a WLAN Access Point (AP), according to embodiments.

FIG. 2—Access Point Block Diagram

FIG. 2 illustrates an exemplary block diagram of an Access Point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry 230. The antenna 234 communicates with the wireless communication circuitry 230 via communication chain 232. Communication chain 232 may be a receive chain, a transmit chain or both. The wireless communication circuitry 230 may be configured to communicate via Wi-Fi or WLAN, e.g., 802.11. The wireless communication circuitry 230 may be configured to communicate via various wireless communication technologies, including, but not limited to, LTE, LTE-A, GSM, WCDMA, CDMA2000, etc.

The processor(s) 204 of the AP 112 may be configured to implement part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof.

As described herein, the AP 112 may include hardware and software components for implementing the above features for reduced power consumption and/or latency, as well as the various other techniques described herein. The processor 204 of the AP 112 may be configured to implement part or all of the features described herein, e.g., by executing program instructions stored on a memory medium (e.g., a non-transitory computer-readable memory medium). Alternatively (or in addition), the processor 204 may be configured as a programmable hardware element, such as an FPGA (Field Programmable Gate Array), or as an ASIC (Application Specific Integrated Circuit). Alternatively (or in addition), the processor 204, in conjunction with one or more of the other components 230, 232, 234, 240, 250, 260, 270 may be configured to implement part or all of the features described herein. As a specific example, the AP 112 may be configured to transmit a beacon frame including the Multicast Schedule Element illustrated in FIG. 7.

Figure 3:
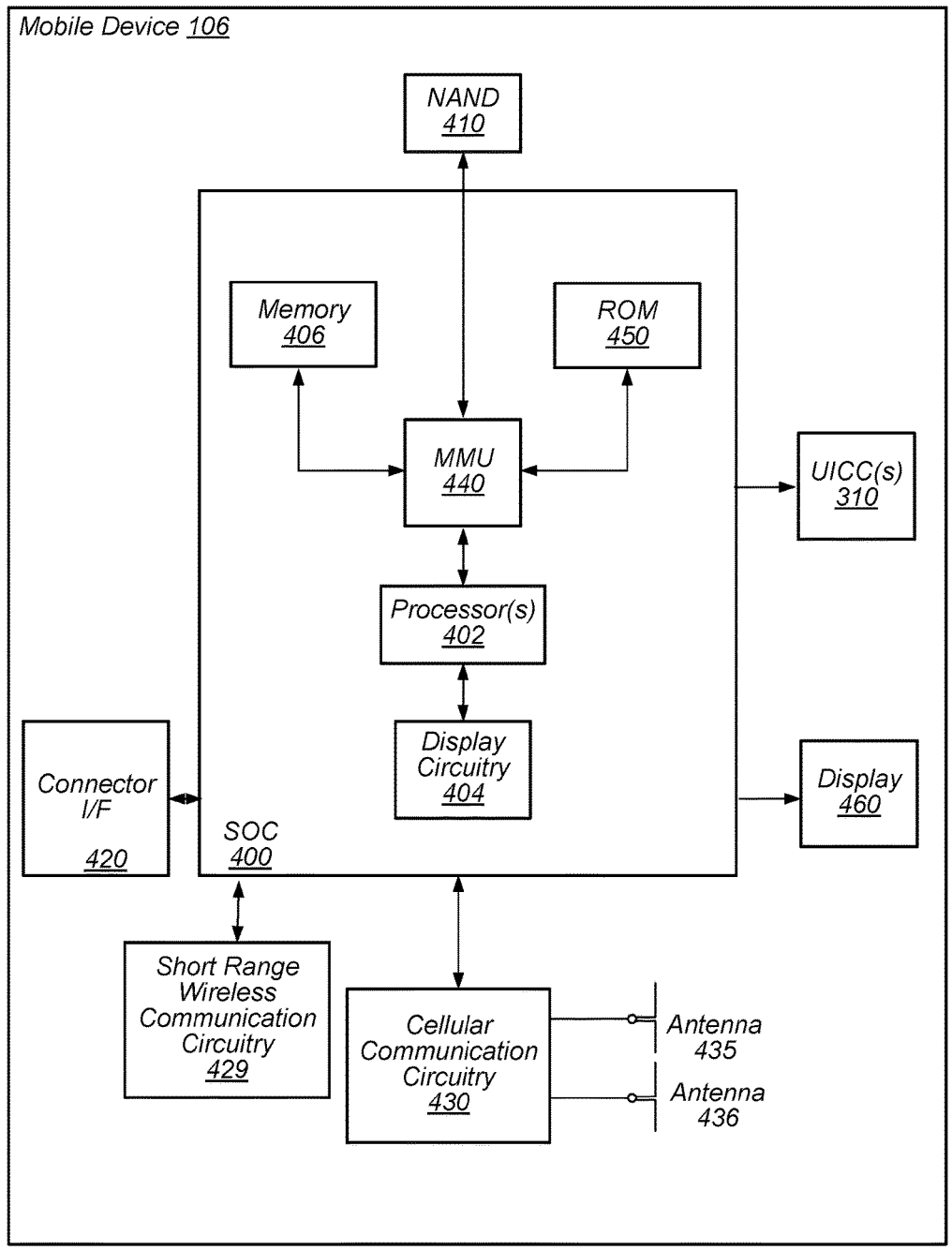
FIG. 3 is an example block diagram of a mobile device, according to embodiments.

FIG. 3—Mobile Device Block Diagram

FIG. 3 illustrates an example simplified block diagram of a mobile device 106. As shown, the mobile device 106 may include a system on chip (SOC) 400, which may include portions for various purposes. The SOC 400 may be coupled to various other circuits of the mobile device 106. For example, the mobile device 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth™ and WLAN circuitry). The mobile device 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, e.g., two antennas 435 and 436 as shown. The short range wireless communication circuitry 429 may also couple to one or both of the antennas 435 and 436 (this connectivity is not shown for ease of illustration), or to different antennas.

As shown, the SOC 400 may include processor(s) 402, which may execute program instructions for the mobile device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector interface (I/F) 420, and/or display 460. The MMU 440 may be configured to perform memory protection and page table translation or set up. In some embodiments, the MMU 440 may be included as a portion of the processor(s) 402.

As noted above, the mobile device 106 may be configured to communicate wirelessly using one or more radio access technologies (RATs). The mobile device 106 may be configured to communicate according to a WLAN RAT for communication in a WLAN network, such as that shown in FIG. 1. The mobile device 106 may also be configured to communicate on other RATs, such as cellular RATs, as desired.

As described herein, the mobile device 106 may include hardware and software components for implementing the above features for reduced power consumption and/or latency, as well as the various other techniques described herein. The processor 402 of the mobile device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition), the processor 402 of the mobile device 106, in conjunction with one or more of the other components 400, 404, 406, 410, 420, 430, 435, 440, 450, 460 may be configured to implement part or all of the features described herein.

As used herein, the term "mobile device" may refer to a device such as the mobile device 106 described above.

Figure 5:
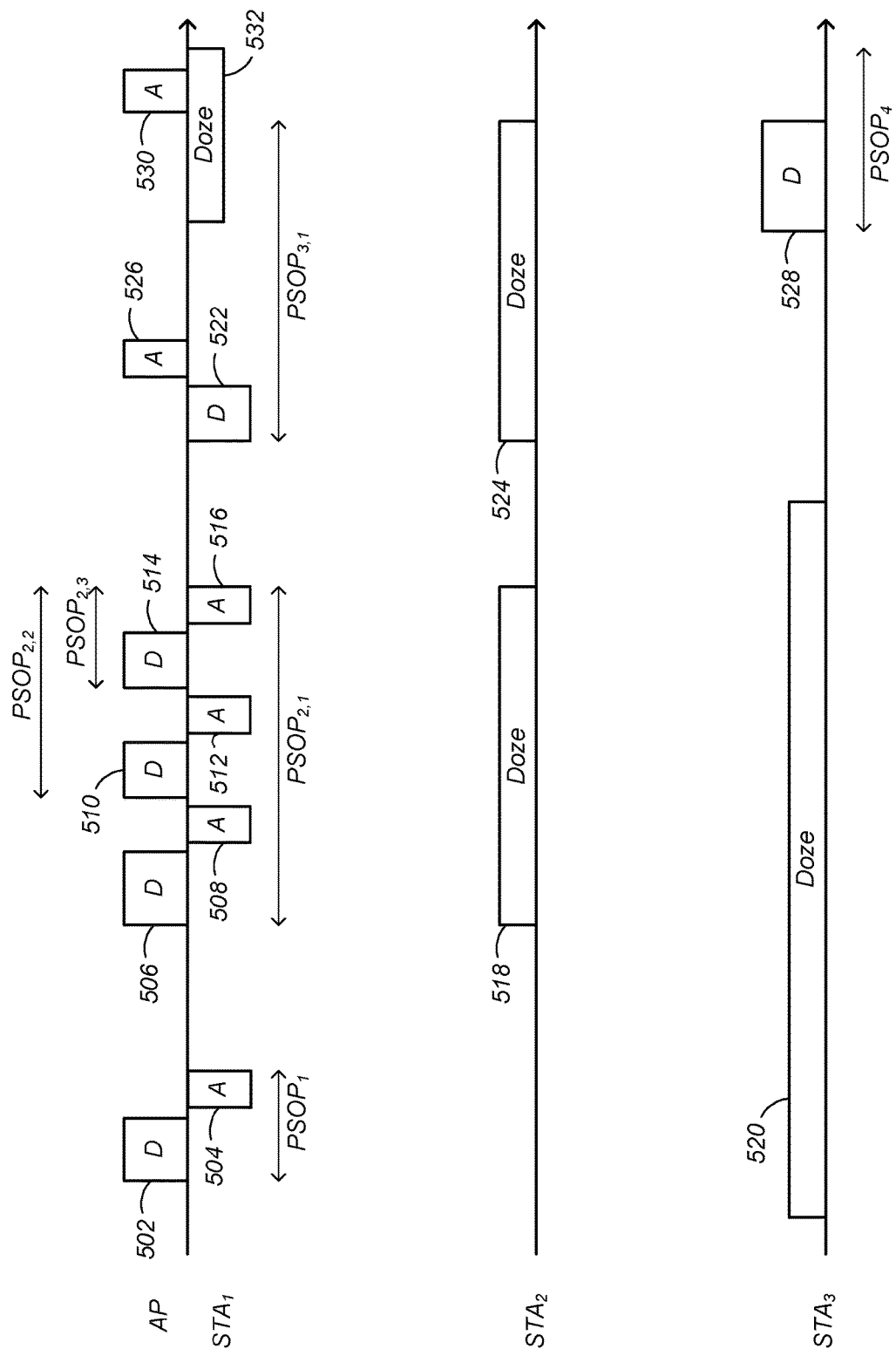
FIG. 5 is a timeline demonstrating use of PSOPs by an AP and mobile devices.

FIG. 5—Power Save Opportunity Operation

During periods when a mobile device is engaging in a frame exchange sequence, other mobile devices may be unable to utilize the channel. However, IEEE 802.11 does not provide for the other mobile devices to utilize this time as a power saving opportunity.

By applying the methods and systems herein, mobile devices, such as mobile device 106, may be configured to take advantage of a power save opportunity (PSOP) while other devices are using the channel. Specifically, mobile devices may save power by transitioning to a Doze state until a time when the channel is predicted to be available.

FIG. 5 illustrates a timeline demonstrating use of PSOPs. FIG. 5 demonstrates possible behavior of three mobile devices ($STA_1$, $STA_2$, and $STA_3$) and an AP, as time progresses from left to right.

The AP may transmit a data frame 502 addressed to STA1 on the channel. The data frame 502 may identify a PSOP. A PSOP (also referred to as a PSOP duration) may be characterized as the remaining duration of time for a STA not participating in the current frame exchange sequence to use as an opportunity to conserve power; e.g., by transitioning to a Doze state. For example, the PSOP may be a predicted time remaining in a frame exchange. Specifically, the data frame 502 may identify a PSOP illustrated in FIG. 5 as $PSOP_1$. In this example, the AP has only one data frame to transmit to $STA_1$, and expects to receive an Acknowledge (ACK) frame 504 in response. Therefore, the AP may predict the PSOP duration to terminate with the end of the transmission of the ACK 504.

Figure 14:
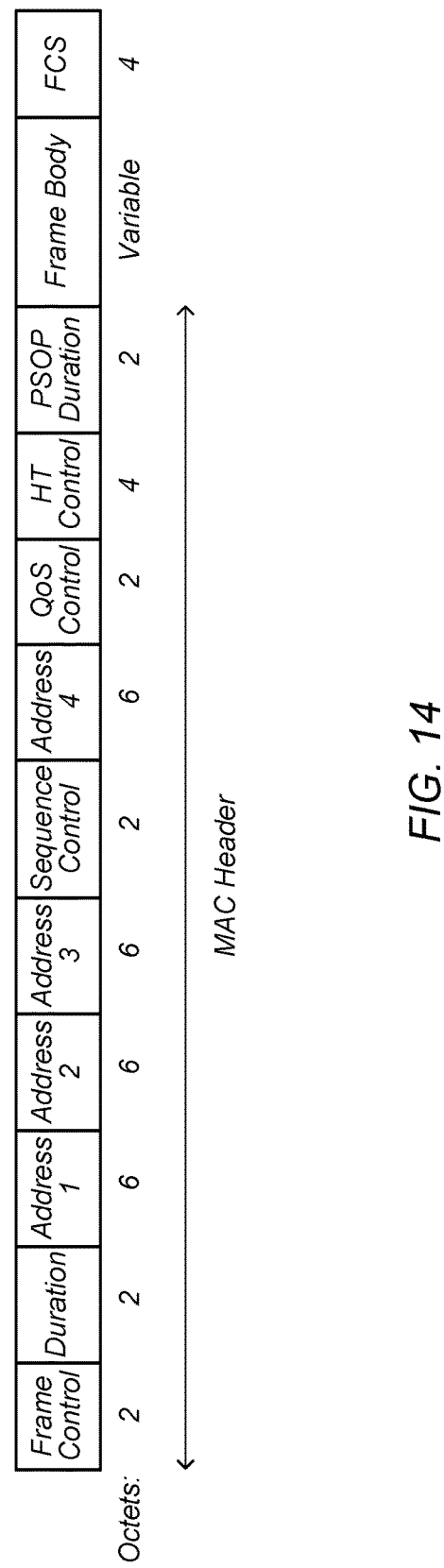
FIG. 14 illustrates an example Media Access Control (MAC) header including PSOP information, according to embodiments.

As an example of PSOP identification, a PSOP may be identified by one or more fields in a header of the frame. For example, a MAC header may include one or more fields identifying the PSOP, e.g., as illustrated in FIG. 14. As a specific example, the MAC header may include a PSOP Duration field that indicates the predicted remaining duration of the PSOP in microseconds. This field may be implemented as a 16-bit field, for example. Additionally, the Frame Control subfield of the MAC header may include a PSOP Duration Presence bit indicating the presence of the PSOP Duration subfield within the MAC header.

As another example, the physical (PHY) layer header may include one or more fields identifying the PSOP. As a specific example, the signal (SIG) field of the PHY layer header may include one or more subfields, such as the following:

PSOP Factor: This subfield may indicate the remaining time period of the PSOP, expressed as a multiple of the current PHY Layer Convergence Procedure (PLCP) Protocol Data Unit (PPDU) duration. For example, this may be a 4-bit field indicating integer values ranging from 1 to 16. In other words, the PSOP factor subfield may indicate how many frames having the same size as the present frame would fit in the predicted time remaining of the PSOP.

Partial Unicast and Multicast Address Identifier: This subfield may include a non-unique Receiver Address (RA) and Basic Service Set (BSS) Identifier (BSSID), and may be used to identify one or more intended recipients and BSSID. For example, the 9-bit Partial Association Identifier (PAID) field defined by 802.11ac may be retasked to serve as the Partial Unicast and Multicast Address Identifier.

Multicast Flag: This subfield may include a single bit indicating whether the Partial Unicast and Multicast Address Identifier subfield specifies a unicast address or a multicast address. For example, one bit of the GroupID field defined by 802.11ac may be retasked to serve as the Multicast Flag.

Any mobile device receiving a frame identifying a PSOP may derive the duration of the PSOP based on information retrievable from the PHY layer header. For example, the PSOP duration (e.g. in milliseconds) may be derived by multiplying the value indicated in the PSOP Factor subfield by the current PPDU duration. The current PPDU duration represents the amount time required to transmit the current frame, and may be derived from the Modulation and Coding Set (MCS) of the current frame, which provides a ratio of data bits transmitted to total bits transmitted, the length of the current frame (e.g., in bytes), and the channel width. The MCS and length of the current frame and channel width may typically be provided in the PHY layer header.

FIG. 4 illustrates example PSOP durations possible for certain configurations of three different 802.11 standards, which also can represent maximum durations. For example, for 802.11ac, the PPDU duration can be 5.484 ms. Thus, with a 4-bit PSOP Factor subfield, a frame may identify a PSOP up to 5.484*16=87.74 ms.

Identifying the PSOP in the PHY layer header may present advantages over identifying the PSOP in the MAC header, although both embodiments are contemplated herein. For example, information in the PHY layer header may be decoded sooner than information in the MAC header, which may allow the mobile device to take advantage of the PSOP sooner, resulting in greater power savings. Use of information in the MAC header may be further delayed by the fact that information in the MAC header may only be 'trusted' after the frame passes a Frame Check Sequence (FCS) check, wherein the FCS is received in the last 4 octets of the MAC Protocol Data Unit (MPDU). Additionally, the MAC header may be encoded with different schemes (such as a low-density parity-check (LDPC) code), which one or more mobile devices within range may be unable to decode. Thus, information in the MAC header may not be universally available to every mobile device. Additionally, the MAC header may be encoded with a higher MCS than the PHY layer header; i.e., the MAC header may have less error correction. Thus, where the signal bearing the frame is weak, the mobile device may not receive the frame with a sufficient signal-to-noise ratio to decode the MAC header, although the PHY layer header may be decodable.

In response to the data frame 502, $STA_1$ may transmit the ACK frame 504 addressed to the AP. The ACK frame 504 may also identify a PSOP. Typically, a PSOP identified by the ACK frame 504 may be shorter than the PSOP identified by the data frame 502 by approximately the time required to transmit the data frame 502. It should be noted that a PSOP Factor subfield included in the ACK frame 504 may be significantly different than a PSOP Factor subfield included in the data frame 502 because the PPDU duration of the ACK frame 504 may differ from the PPDU duration of the data frame 502. In the present example, the PSOP Factor subfield included in the ACK frame 504 may be 1 because the PSOP is predicted to terminate following the present PPDU.

At a later time, the AP may transmit a data frame 506 addressed to $STA_1$. The data frame 506 may identify a PSOP illustrated in FIG. 5 as $PSOP_{2,1}$. In this example, the AP has three data frames to transmit to $STA_1$, and expects to receive an ACK frame in response to each data frame. Therefore, the AP may predict the time required for transmission of these frames (i.e., frames 506-516), and identify that time as $PSOP_{2,1}$. In response to the data frame 506, $STA_1$ may transmit an ACK frame 508.

The AP may then transmit another data frame 510 addressed to $STA_1$. The data frame 510 may identify a PSOP illustrated in FIG. 5 as $PSOP_{2,2}$. In this example, the predicted end time of the frame exchange has not changed since the data frame 506 was transmitted, so the $PSOP_{2,2}$ may be shorter than the $PSOP_{2,1}$ by approximately the time spent in transmitting the data frame 506 and the ACK frame 508. $STA_1$ may respond by transmitting an ACK frame 512.

Similarly, the AP may transmit another data frame 514 addressed to $STA_1$, which may identify a PSOP illustrated in FIG. 5 as $PSOP_{2,3}$, followed by transmission by $STA_1$ of an ACK frame 516. In this example, the frame exchange may terminate following the ACK frame 516 at approximately the time predicted by the AP. Although not illustrated in FIG. 5, each of the ACK frames 508, 512, and 516 may also identify a PSOP predicting a time remaining until the end of the frame exchange.

The mobile devices $STA_2$ and $STA_3$ are not involved in the frame exchanges of the preceding examples. However, they may take advantage of the PSOPs identified in the various frames transmitted between the AP and STA'. For example, $STA_2$ may detect the data frame 502, and recognize that the channel is predicted to be busy until the end of $PSOP_1$. $STA_2$ may then make a determination regarding whether to transition to a Doze state until the end of $PSOP_1$. Specifically, although the identification of a PSOP in the data frame 502 may provide an opportunity for a mobile device not participating in the frame exchange to enter a Doze state, the identification of the PSOP may or may not require a transition to the Doze state. In the present example, $STA_2$ may determine not to transition to the Doze state in response to detecting the data packet 502. For example, $STA_2$ may determine that $PSOP_1$ is too brief to justify transitioning to the Doze state.

$STA_2$ may later detect the data frame 506, and recognize that the channel is predicted to be busy until the end of $PSOP_{2,1}$. $STA_2$ may then again make a determination regarding whether to transition to a Doze state until the end of the identified PSOP. At 518 $STA_2$ may determine to transition to the Doze state. $STA_2$ may then transition back to an Awake state at the end of $PSOP_{2,1}$.

Thus, including an identification of $PSOP_{2,1}$ within the data packet 506 allows $STA_2$ to save power by remaining in a Doze state throughout this period of time. Because the channel is predicted to be busy during this period of time, $STA_2$ may doze with confidence that it will not miss communication opportunities. The determination to enter a Doze state may alternatively be based on other information communicated in a frame, such as information regarding a SP.

As shown in FIG. 5, $STA_3$ may have been in a Doze state throughout $PSOP_1$ and $PSOP_2$. For example, $STA_1$ may have entered a Doze state according to known procedures unrelated to PSOPs. At some point following $PSOP_2$, $STA_3$ may transition to the Awake state, and begin monitoring the channel, e.g., to monitor for communication opportunities.

Following $PSOP_2$, $STA_1$ may initiate a SP beginning with a data frame 522 for traffic having a low access category (AC), such as background (BK) traffic. For example the data frame 522 may trigger a U-APSD frame exchange. The data frame 522 may have additional frames to transmit, and may thus predict a PSOP duration based on the time it expects to use to transmit the data frames and to receive associated ACK frames from the AP. For example, the data frame 522 may identify the service period illustrated in FIG. 5 as $PSOP_{3,1}$.

$STA_2$ may detect the data frame 522, and determine to transition to the Doze state for the duration of $PSOP_{3,1}$. The AP may also receive the data frame 522, and may respond by transmitting an ACK frame 526.

$STA_3$ may also detect the data frame 522. However, $STA_3$ may determine to not transition to the Doze state, because it has urgent data to send, such as video data. Because traffic having a video (VI) access code is prioritized above BK traffic, $STA_3$ may recognize that the SP initiated by $STA_1$ need not prevent $STA_3$ from transmitting data.

Following the ACK frame 526, $STA_3$ may disregard the PSOP information and contend for the channel according to conventional procedures. In this example, $STA_3$ may gain access to the channel and transmit a data frame 528 addressed to the AP. The data frame 528 may identify a PSOP illustrated in FIG. 5 as $PSOP_4$.

At 532, $STA_1$ may detect the data frame 528 identifying $PSOP_4$. For U-APSD, a mobile device may typically know that a SP has ended when it receives a frame containing an ESOP bit set to 1. However, in the current scenario, $STA_1$ may use the detection of data frame 528 as a signal that this SP has ended, despite not having received an ESOP bit set to 1. Specifically, the inclusion of new PSOP information in the data frame 528 may provide an alternate indication that the preceding SP has ended. In response, $STA_1$ may determine to transition to a Doze state until the end of $PSOP_4$.

Figure 6:
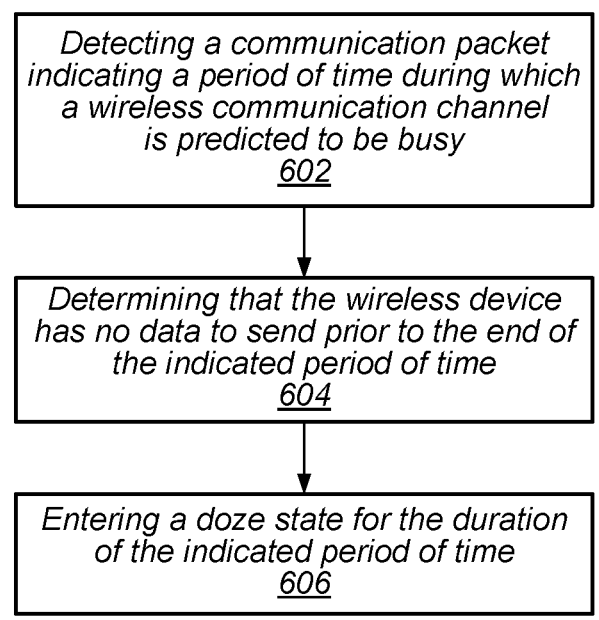
FIG. 6 is a flowchart diagram illustrating an exemplary method for performing power management in a mobile device, according to embodiments.

FIG. 6—Power Management Using a PSOP

FIG. 6 is a flowchart diagram illustrating an exemplary method for performing power management in a mobile device. The method shown in FIG. 6 may be used in conjunction with any of the computer systems or devices shown in the above Figures, among other devices. If desired, it may be the case that the method is more particularly implemented by a mobile device, or, more specifically, by a WLAN/Wi-Fi chipset within a mobile device. Some of the method elements shown may be performed concurrently or in a different order than shown, or may be omitted. Additional method elements may also be performed as desired. As shown, the method may operate as follows.

At 602, a mobile device, such as the mobile device 106, may detect a communication packet on a wireless communication channel. The communication packet may not be addressed to the mobile device. For example, the communication packet may be addressed to a STA other than the mobile device, such as to the AP (transmitted, e.g., by another mobile device) or to another mobile device (transmitted, e.g., by the AP). The communication packet may comprise timing information indicating a period of time during which the wireless communication channel is predicted to be busy. The timing information may be included in a PHY layer header of the communication packet. The timing information may identify a PSOP, as discussed above. For example, the timing information may comprise information indicating a duration of the communication packet, and a multiplier representing a quotient of the indicated period of time divided by the duration of the communication packet. Specifically, the timing information may comprise any of the information for identifying a PSOP discussed in connection with FIG. 5.

At 604, the mobile device may determine that it has no data to send prior to the end of the indicated period of time. For example, the mobile device may determine that it has no data queued to send, or that any queued data is not urgent.

At 606, the mobile device may enter a Doze state for the duration of the indicated period of time. Entering the Doze state may be based at least partly on the timing information, as well as other possible factors such as the determining of step 604. In some scenarios, entering the Doze state may interrupt a service period that the mobile device had previously initiated with the AP.

Figure 7:
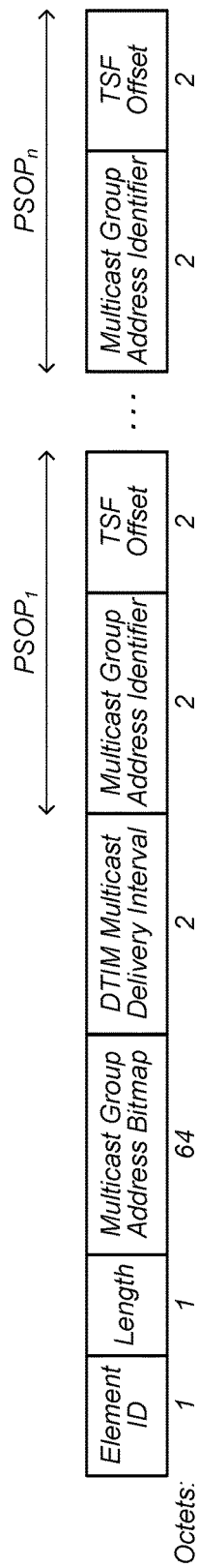
FIG. 7 illustrates an example Multicast Schedule Element to be included in a beacon frame, according to embodiments.

FIG. 7—PSOP for Multicast Traffic

PSOP information may also be provided in connection with multicast traffic. For example, multicast frames that are sent after a beacon frame, and that belong to the same multicast group, may be grouped into a single multicast PSOP. The beacon frame may announce a start time of each multicast PSOP. This multicast PSOP information may allow a mobile device to doze during transmission of one or more multicast PSOPs for which the mobile device is not a member of the multicast group addressed.

As an example, a beacon frame may include a Multicast Schedule Element as illustrated in FIG. 7. As shown, the Multicast Schedule Element may comprise one or more fields such as the following:

Element ID: This may be, e.g., a 1-byte field identifying the Multicast Schedule Element.

Length: This may be, e.g., a 1-byte field indicating the length of the Multicast Schedule Element.

Multicast Group Address Bitmap: This field may indicate the presence of schedule information for each multicast group address contained in this Multicast Schedule Element. For example, Bit 0 may indicate whether the AP has multicast traffic for Multicast Group Address 0, Bit 1 may correspond to Multicast Group Address 1, etc. The length of this field may be, e.g., 64 bytes, accommodating, e.g., 512 unique multicast groups.

Delivery Traffic Indication Message (DTIM) Multicast Delivery Interval: This field may indicate a total duration of time, e.g., in microseconds, following the current beacon frame (i.e. following the current DTIM) where multicast frames may be sent by the AP. Thus, each mobile device that receives this field may determine a time by which the AP will cease sending multicast traffic associated with the present beacon. The time may be relative to the timing synchronization function (TSF) value received in the beacon frame. For example, this may be a 2-byte field.

Multicast Group Address Identifier: This field may uniquely identify a particular multicast group. The length of this field may be, e.g., 2 bytes. As shown in FIG. 7, this field may be repeated for each multicast group for which the AP has multicast traffic, as indicated by the Multicast Group Address Bitmap. For example, this frame format may use the 9 least significant bits of the Multicast Group Address Identifier field to uniquely identify a multicast group. Therefore, each AP may have up to 512 unique multicast groups (i.e. matching the number accommodated by the Multicast Group Address Bitmap). All other values of this 2-byte field may be reserved.

Timing Synchronization Function (TSF) Offset: This field may indicate a start time of a multicast PSOP associated with a multicast group. As shown in FIG. 7, this field may be repeated for each multicast group for which the AP has multicast traffic, as indicated by the Multicast Group Address Bitmap. For example, each iteration of this field may be paired with an iteration of the Multicast Group Address Identifier identifying the associated multicast group, as shown in FIG. 7. This field may indicate an offset time, e.g., in microseconds, relative to a TSF value received in the beacon frame. The length of this field may be, e.g., 2 bytes.

Figure 8:
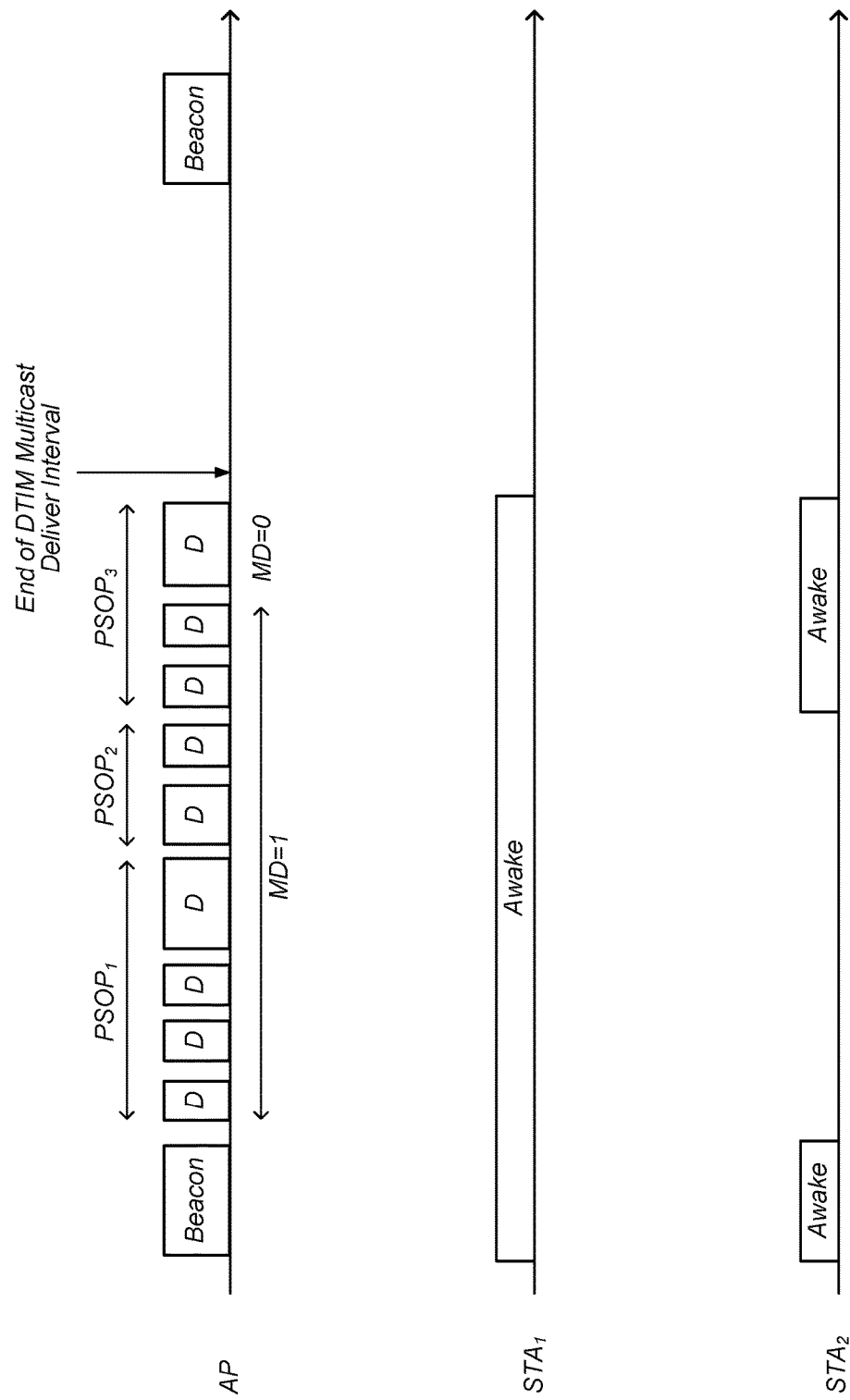
FIGS. 8-12 are example timelines demonstrating use of multicast PSOPs by an AP and mobile devices, according to various scenarios.

FIG. 8—Multicast PSOP Operation

FIG. 8 illustrates an example timeline demonstrating use of multicast PSOPs. FIG. 8 demonstrates possible behavior of two mobile devices ($STA_1$ and $STA_2$) and an AP, as time progresses from left to right.

The AP may transmit a first beacon frame, which may include multicast PSOP information. For example, the beacon frame may include the Multicast Schedule Element illustrated in FIG. 7.

$STA_1$ illustrates the behavior of a mobile device in the prior art in connection with the beacon frame. Specifically, $STA_1$ may be in an Awake state to receive the first beacon frame. Further, packets addressed to a specific multicast group are typically not grouped together in time, so $STA_1$ may remain awake to receive all multicast frames until receiving a frame in which the More Data (MD) bit is set to 0. After receiving a frame with the MD bit set to 0, $STA_1$ may transition to a Doze state until the next beacon frame. Because the majority of multicast frames are likely to be addressed to multicast groups of which $STA_1$ is not a member, $STA_1$ consumes unnecessary power by remaining in the Awake state during transmission of these frames.

$STA_2$ illustrates the behavior of a mobile device making use of the PSOP information included in the beacon frame. Specifically, $STA_2$ may be in the Awake state to receive the beacon frame. $STA_2$ may be a part of a first multicast group having a first multicast group address. $STA_2$ may therefore examine a Multicast Group Address Bitmap included in the beacon frame to determine whether the AP will provide a PSOP associated with the first multicast group address. If not, $STA_2$ may decide to transition to a Doze state for the duration of the DTIM Multicast Delivery Interval. For example, $STA_2$ may transition to the Doze state even before completion of the Multicast Schedule Element because $STA_2$ is aware that the portions of the Multicast Schedule Element following the DTIM Multicast Delivery Interval field will not be applicable to $STA_2$.

However, in the scenario illustrated in FIG. 8, $STA_2$ may determine that the Multicast Group Address Bitmap indicates that the Multicast Schedule Element includes PSOP information associated with the first multicast group. Specifically, the Multicast Schedule Element may include a Multicast Group Address Identifier field identifying the first multicast group, and an associated TSF Offset field identifying a predicted time at which the AP will begin sending data frames addressed to the first multicast group. In this scenario, the associated TSF Offset field may identify the start of $PSOP_3$ as the predicted time at which the AP will begin to transmit data frames addressed to the first multicast group. More broadly, the PSOP information in the beacon frame may identify $PSOP_3$ as associated with the first multicast group.

Because the data frames transmitted by the AP during $PSOP_1$ and $PSOP_2$ are addressed to multicast groups of which $STA_2$ is not a part, $STA_2$ may decide to transition to the Doze state during those PSOPs. $STA_2$ may then transition to the Awake state at or before the beginning of $PSOP_3$. Following $PSOP_3$, $STA_2$ may transition back to the Doze state until the next beacon frame. Thus, $STA_2$ may conserve power by dozing throughout periods of traffic that are not of interest.

FIG. 9-12—Interrupted Multicast PSOP Operation

In general, following receipt of Multicast Schedule Element in a beacon frame, a mobile device may doze until the start of a multicast PSOP of interest, if any. FIG. 8 illustrates a scenario in which the multicast PSOPs occur as predicted, as discussed above. However, because of varying channel conditions, transmission of multicast frames may sometimes be delayed, which may disrupt the predicted timing of the PSOPs. In such cases, a dozing mobile device may find unexpected conditions upon transitioning back to the Awake state. FIGS. 9-12 are timelines demonstrating four such scenarios.

Figure 9:
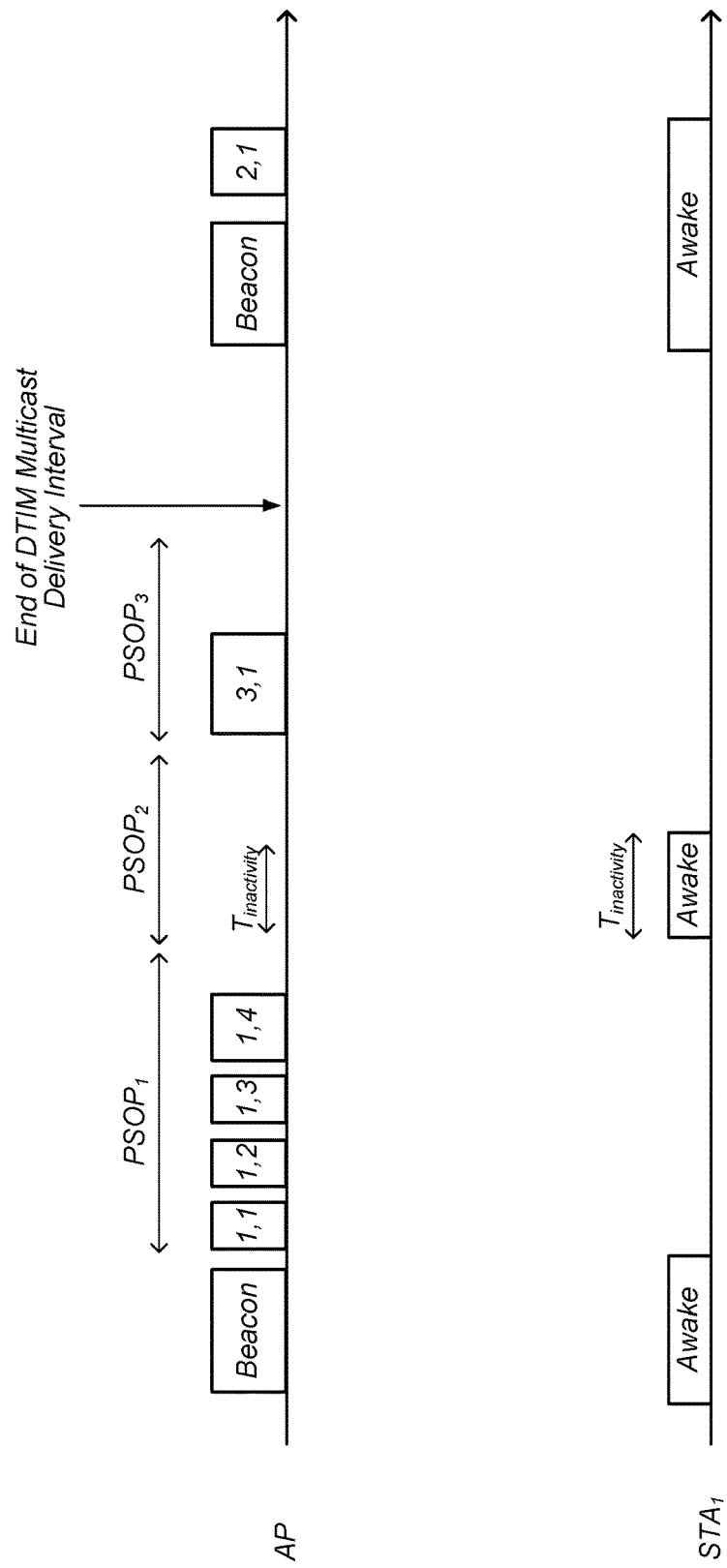

A first scenario is illustrated in FIG. 9. As illustrated, the AP may transmit a first beacon frame, which may include multicast PSOP information identifying $PSOP_1$, $PSOP_2$, and $PSOP_3$. For example, the AP may have four frames ($frame_{1,1}$, $frame_{1,2}$, $frame_{1,3}$, and $frame_{1,4}$) to transmit during $PSOP_1$, one frame ($frame_{2,1}$) to transmit during $PSOP_2$, and one frame ($frame_{3,1}$) to transmit during $PSOP_3$.

$STA_1$ may be in the Awake state to receive the first beacon frame. $STA_1$ may be a part of a first multicast group, which the first beacon frame may identify as associated with $PSOP_2$. Therefore, following the first beacon frame, $STA_1$ may transition to the Doze state until the start of $PSOP_2$.

As illustrated, $frame_{1,1}$ through $frame_{1,4}$ are transmitted during $PSOP_1$ as scheduled. However, during $PSOP_2$, $frame_{2,1}$ is not transmitted as scheduled. For example, transmission of frame 2,1 may be delayed, e.g., because a device associated with an overlapping BSS may be using the channel.

If the delay of $PSOP_2$ meets a predetermined length of time, illustrated in FIG. 9 as $T_{inactivity}$, then the AP may cancel the scheduled transmission of the packets associated with $PSOP_2$. Thus, the AP may not transmit any frames during $PSOP_2$. In this way, delay of frames scheduled for transmission during subsequent PSOPs may be avoided. For example, as illustrated in FIG. 9, $frame_{3,1}$ may be transmitted at the start of $PSOP_3$ as scheduled.

When $STA_1$ transitions to the Awake state at the start of $PSOP_2$, it does not detect $frame_{2,1}$ as expected. Instead, $STA_1$ detects the period of inactivity during which the AP does not transmit on the channel. Once this period of delay reaches a duration of $T_{inactivity}$, $STA_1$ may recognize that the AP will cancel the packet transmissions scheduled to occur during $PSOP_2$. In response, $STA_1$ may transition to the Doze state until the start of a second beacon frame. Thus, $STA_1$ may realize power savings by not remaining awake for the remainder of the DTIM Multicast Delivery Interval.

The second beacon frame may include multicast PSOP information identifying a new PSOP during which $frame_{2,1}$ may be rescheduled for transmission to the first multicast group. The new PSOP may be scheduled relative to other PSOPs according to its original group order, a round-robin order, a randomized order, or any other appropriate ordering.

Figure 10:
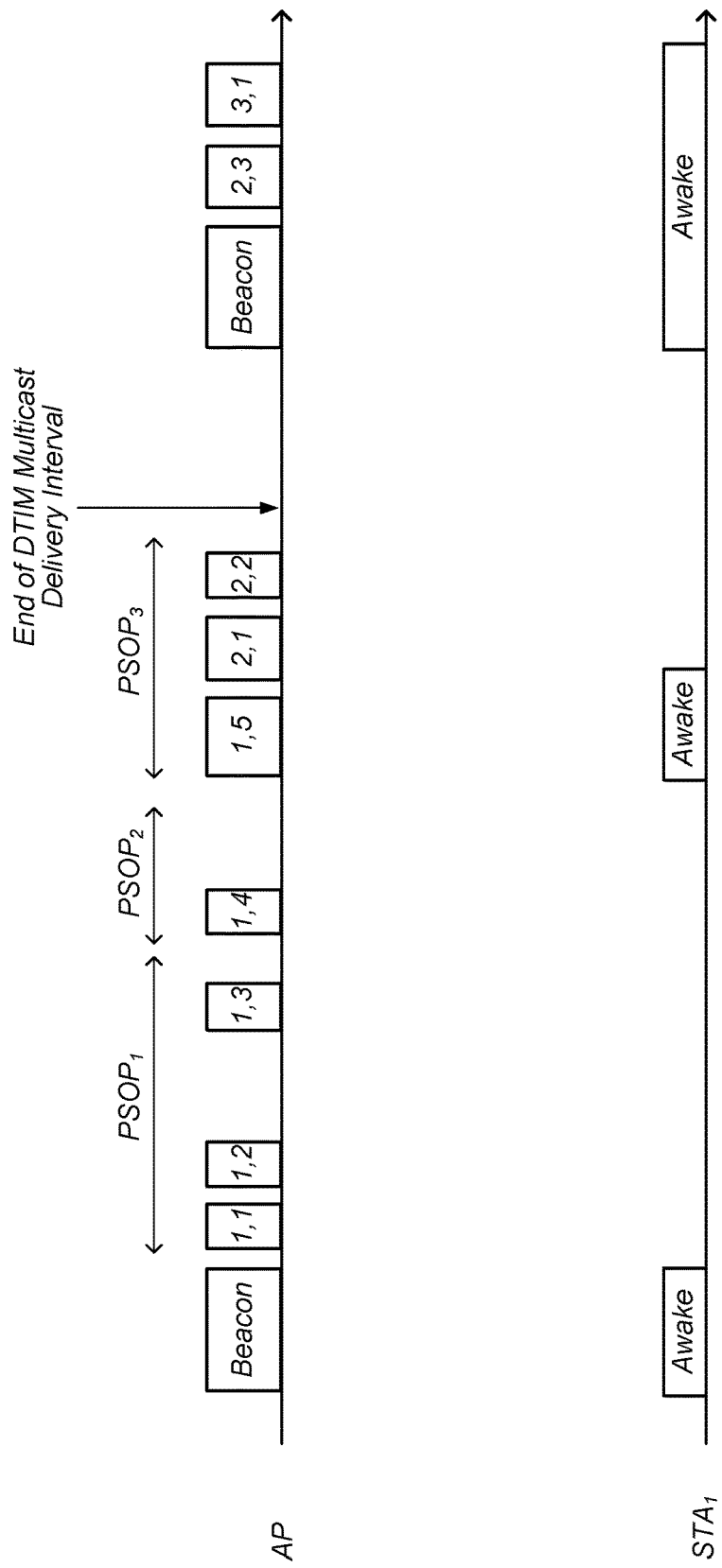

A second scenario is illustrated in FIG. 10. As illustrated, the AP may transmit a first beacon frame, which may include multicast PSOP information identifying $PSOP_1$, $PSOP_2$, and $PSOP_3$. For example, the AP may have five frames ($frame_{1,1}$, $frame_{1,2}$, $frame_{1,3}$, $frame_{1,4}$, and $frame_{1,5}$) to transmit during $PSOP_1$, three frames ($frame_{2,1}$, $frame_{2,2}$, and $frame_{2,3}$) to transmit during $PSOP_2$, and one frame ($frame_{3,1}$) to transmit during $PSOP_3$.

$STA_1$ may be in the Awake state to receive the first beacon frame. $STA_1$ may be a part of a first multicast group, which the first beacon frame may identify as associated with $PSOP_3$. Therefore, following the first beacon frame, $STA_1$ may transition to the Doze state until the start of $PSOP_3$.

As illustrated, two frames ($frame_{1,1}$ and $frame_{1,2}$) are transmitted during $PSOP_1$ as scheduled. However, following $frame_{1,2}$, delays are introduced, causing $frame_{1,4}$ and $frame_{1,5}$ to be transmitted after the predicted period of $PSOP_1$. As noted above, delays may be introduced, e.g., because a device associated with an overlapping BSS may be using the channel. As a result, transmission of subsequent frames is also delayed. Specifically, as illustrated, $frame_{2,2}$ is the last frame to be transmitted prior to the end of the DTIM Multicast Delivery Interval. Thus, all multicast frames scheduled for transmission after $frame_{2,2}$ (e.g., $frame_{2,3}$ and $frame_{3,1}$) may be delayed until the next multicast period, following a second beacon frame.

When $STA_1$ transitions to the Awake state at the time scheduled as the start of $PSOP_3$, it does not detect $frame_{3,1}$ as expected. Instead, $STA_1$ may detect $frame_{1,5}$. Based at least in part on the information identifying the three PSOPs included in the first beacon frame, $STA_1$ may determine that the time remaining of the DTIM Multicast Delivery Interval is insufficient to allow transmission of $packet_{3,1}$. For example, $STA_1$ may determine that the time remaining is less than the time allocated for $PSOP_2$, which was scheduled to occur prior to transmission of $packet_{3,1}$. In response, $STA_1$ may transition to the Doze state until the start of a second beacon frame. Thus, $STA_1$ may realize power savings by not remaining awake for the remainder of the DTIM Multicast Delivery Interval.

The second beacon frame may include multicast PSOP information identifying new PSOPs during which $frame_{2,3}$ and $frame_{3,1}$ may be rescheduled for transmission to their respective multicast groups, as discussed above.

Figure 11:
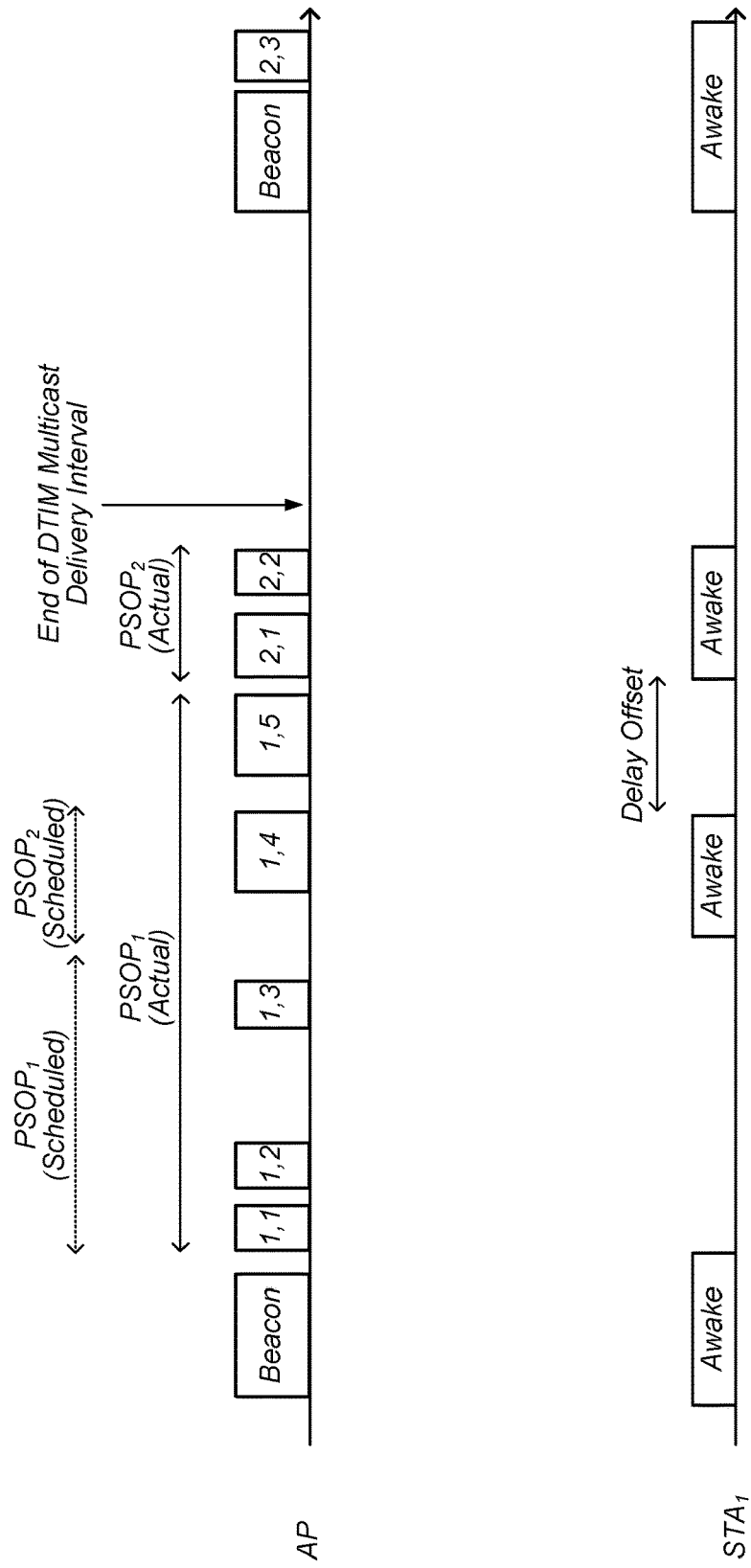

A third scenario is illustrated in FIG. 11. As illustrated, the AP may transmit a first beacon frame, which may include multicast PSOP information identifying $PSOP_1$ and $PSOP_2$. For example, the AP may have five frames ($frame_{1,1}$, $frame_{1,2}$, $frame_{1,3}$, $frame_{1,4}$, and $frame_{1,5}$) to transmit during $PSOP_1$ and three frames ($frame_{2,1}$, $frame_{2,2}$, and $frame_{2,3}$) to transmit during $PSOP_2$.

$STA_1$ may be in the Awake state to receive the first beacon frame. $STA_1$ may be a part of a first multicast group, which the first beacon frame may identify as associated with $PSOP_2$. Therefore, following the first beacon frame, $STA_1$ may transition to the Doze state until the start of $PSOP_2$.

As illustrated, two frames ($frame_{1,1}$ and $frame_{1,2}$) are transmitted during $PSOP_1$ as scheduled. However, following $frame_{1,2}$, delays are introduced, causing $frame_{1,4}$ and $frame_{1,5}$ to be transmitted after the scheduled period of $PSOP_1$. Thus, the actual duration of $PSOP_1$ is longer than the scheduled duration, as illustrated in FIG. 11. As a result, transmission of subsequent frames is also delayed. Specifically, as illustrated, the actual time of $PSOP_2$ occurs after the scheduled time of $PSOP_2$. Additionally, the actual period of $PSOP_2$ includes the transmission of only $frame_{2,1}$ and $frame_{2,2}$, while $frame_{2,3}$ may be delayed until the next multicast period, following a second beacon frame.

When $STA_1$ transitions to the Awake state at the time scheduled as the start of $PSOP_2$, it does not detect $frame_{2,1}$ as expected. Instead, $STA_1$ may detect $frame_{1,4}$. $Frame_{1,4}$ may comprise timing information indicating an updated prediction of the remaining duration of $PSOP_1$. For example, the timing information may comprise any of the information for identifying a PSOP discussed in connection with FIG. 5.

Based at least in part on the timing information included in $frame_{1,4}$, $STA_1$ may determine a new predicted start time of $PSOP_2$. In some scenarios, $STA_1$ may also use the information identifying the scheduled PSOPs included in the first beacon frame in determining the new predicted start time of $PSOP_2$. In response, $STA_1$ may transition to the Doze state until the new predicted start time of $PSOP_2$. Thus, $STA_1$ may realize power savings by not remaining awake during this period of delay.

The second beacon frame may include multicast PSOP information identifying new PSOPs during which $frame_{2,3}$ may be rescheduled for transmission to the first multicast group, as discussed above. In some embodiments, $frame_{2,2}$ may include an indication that additional frames that were previously associated with $PSOP_2$ have been delayed until after the second beacon. For example, a More Data (MD) bit of $frame_{2,2}$ may be set to 1. As another example, $frame_{2,2}$ may comprise timing information indicating an updated prediction of the remaining duration of $PSOP_2$, where the timing information indicates a remaining duration of $PSOP_2$ that is greater than the remaining time of the DTIM Multicast Delivery Interval.

Figure 12:
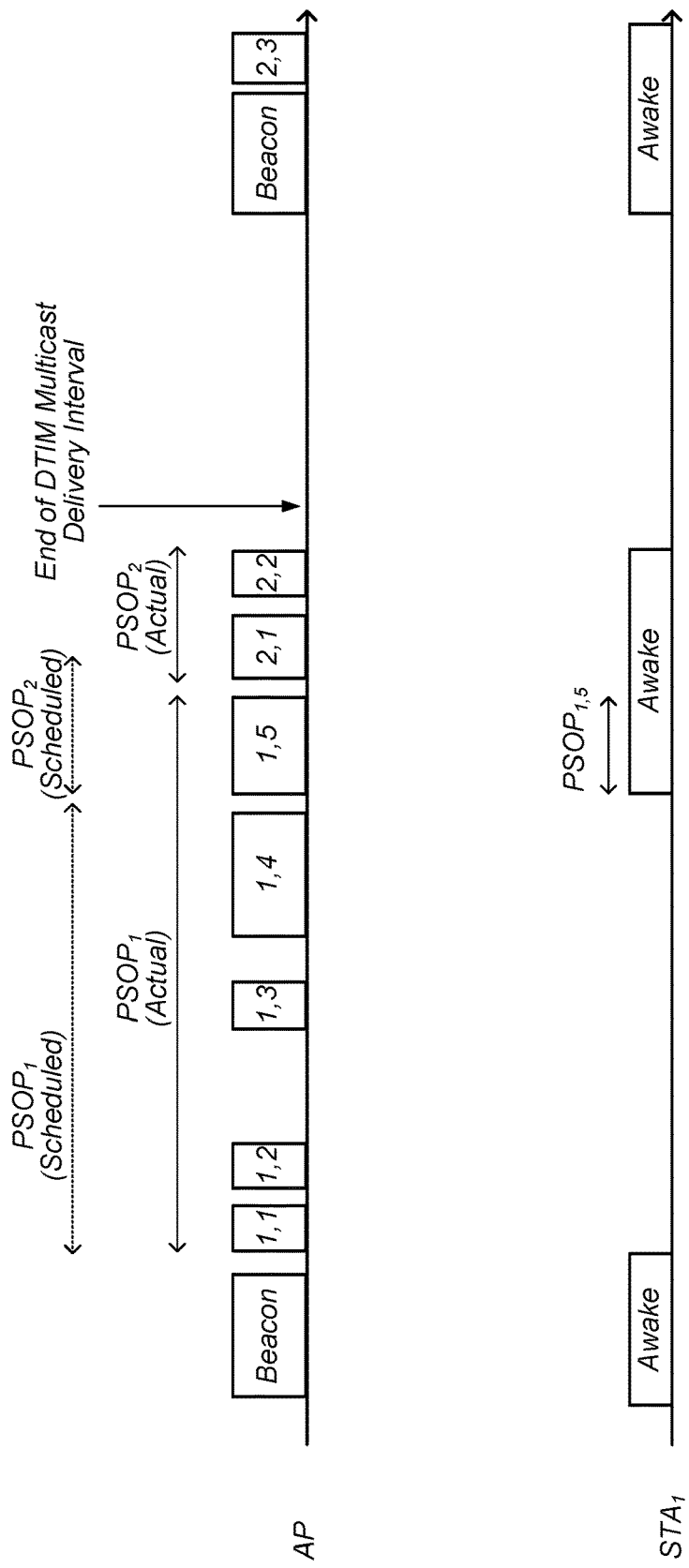

A fourth scenario is illustrated in FIG. 12. As illustrated, the scenario of FIG. 12 begins in the same manner as the scenario of FIG. 11. As in the previous scenario, the actual duration of $PSOP_1$ is longer than the scheduled duration, which delays $PSOP_2$. When $STA_1$ transitions to the Awake state at the time scheduled as the start of $PSOP_2$, it does not detect $frame_{2,1}$ as expected. Instead, $STA_1$ may detect $frame_{1,5}$. $Frame_{1,5}$ may comprise timing information indicating an updated prediction of the remaining duration of $PSOP_1$. For example, the timing information may comprise any of the information for identifying a PSOP discussed in connection with FIG. 5.

Based at least in part on the timing information included in $frame_{1,4}$, $STA_1$ may determine a new predicted start time of $PSOP_2$. In some scenarios, $STA_1$ may also use the information identifying the scheduled PSOPs included in the first beacon frame in determining the new predicted start time of $PSOP_2$. In response, $STA_1$ may determine to remain in the Awake state until the start of $PSOP_2$. For example, $STA_1$ may determine that the new predicted start time of $PSOP_2$ is too soon to justify transitioning to the Doze state.

Figure 13:
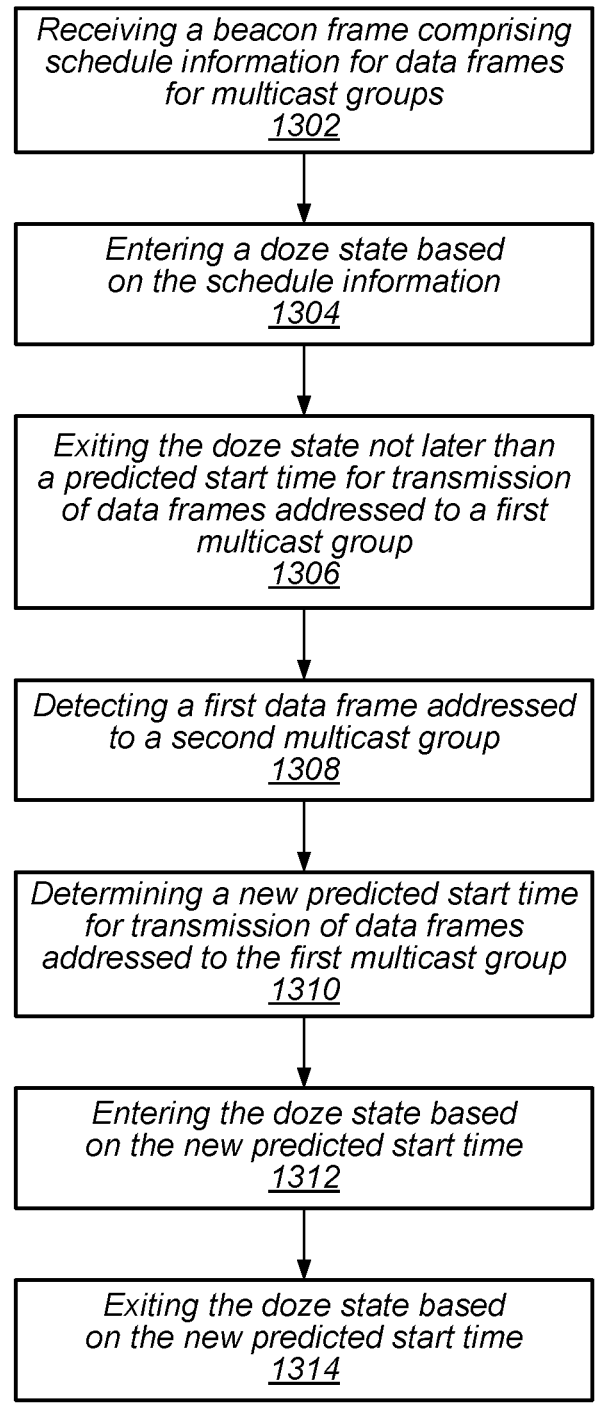
FIG. 13 is a flowchart diagram illustrating an exemplary method for performing power management in a mobile device, according to embodiments.

FIG. 13—Power Management Using a Multicast PSOP

FIG. 13 is a flowchart diagram illustrating an exemplary method for performing power management in a mobile device, according to embodiments. The method shown in FIG. 13 may be used in conjunction with any of the computer systems or devices shown in the above Figures, among other devices. If desired, it may be the case that the method is more particularly implemented by a mobile device, or, more specifically, by a WLAN/Wi-Fi chipset within a mobile device. Some of the method elements shown may be performed concurrently or in a different order than shown, or may be omitted. Additional method elements may also be performed, as desired. As shown, the method may operate as follows.

A mobile device, such as the mobile device 106, may be a member of a first multicast group. At 1302 the mobile device may receive a beacon frame including schedule information for a plurality of multicast groups, including the first multicast group. For example, the beacon frame may identify one or more multicast PSOPs, as discussed above with reference to FIGS. 7-12. The beacon frame may include a reference time and a multicast group address bitmap configured to indicate whether the beacon frame includes schedule information for each defined multicast group. The schedule information for a multicast group may indicate a respective predicted start time for transmission of one or more data frames addressed to the multicast group. For example, the schedule information for a multicast group may include a respective multicast group address identifier configured to uniquely identify the multicast group, and a respective timing offset value indicating the predicted start time for transmission of the one or more data frames addressed to the multicast group relative to the reference time. Specifically, the schedule information may include a Multicast Schedule Element as disclosed in connection with FIG. 7. The beacon frame may also identify a multicast interval identifying a window of time during which the data frames addressed to the plurality of multicast groups may be transmitted. The multicast interval may be identified, e.g., by a DTIM Multicast Delivery Interval field, as discussed in connection with FIG. 7.

At 1304, the mobile device may enter a Doze state based at least in part on the schedule information. For example, the mobile device may enter a Doze state based on a determination that the schedule information identifies a period of time during which data to be sent by the AP will not be addressed to the first multicast group.

At 1306, the mobile device may exit the Doze state. Specifically, the mobile device may exit the Doze state at a time not later than the predicted start time for transmission of the one or more data frames addressed to the first multicast group.

At 1308, the mobile device may detect a first data frame, e.g., transmitted by the AP. The data frame may be addressed to a second multicast group of the plurality of multicast groups. The data frame may be detected at a time after the predicted start time of transmission of the data frames addressed to the first multicast group. The mobile device may recognize, using the schedule information, that the predicted start time for transmission of data frames addressed to the second multicast group was earlier than the predicted start time for transmission of data frames addressed to the first multicast group. This may occur, for example, if transmission of the multicast frames was temporarily interrupted or otherwise delayed.

The first data frame may include timing information indicating a predicted remaining time for transmission of data frames addressed to the second multicast group. For example, this timing information may include any of the information for identifying a PSOP discussed in connection with FIG. 5.

If the mobile device instead does not detect any data from the AP for a period of inactivity of a predefined length of time ($T_{inactivity}$), then the mobile device may determine that the AP will cancel the scheduled transmission of the data frames addressed to the first multicast group in response to the period of inactivity. The mobile device may therefore enter the Doze state for the remainder of the multicast interval.

At 1310, the mobile device may determine a new predicted start time for transmission of the data frames addressed to the first multicast group. The new predicted start time may be determined based on the timing information included in the first data frame. The new predicted start time may be further based on the schedule information included in the beacon frame. For example, the mobile device may adjust the predicted start times provided in the schedule information based on the timing information included in the first data frame.

In some scenarios, the new predicted start time may be after the multicast interval identified in the beacon frame. For example, any data frames addressed to one the plurality of multicast groups that are not transmitted during the multicast interval identified by the present beacon frame may be delayed until a multicast interval identified by a next beacon frame.

At 1312, the mobile device may enter a Doze state based at least in part on the new predicted start time.

At 1314, the mobile device may exit the Doze state not later than the new predicted start time. In scenarios where the new predicted start time is after the multicast interval, step 1314 may comprise exiting the Doze state in time to receive a next beacon frame.

In some embodiments, a method for performing power management in a mobile device that is a member of a first multicast group may comprise the mobile device receiving a beacon frame comprising schedule information for each of a plurality of multicast groups, the plurality of multicast groups comprising the first multicast group. The respective schedule information for each respective multicast group may indicate a respective predicted start time for transmission of one or more data frames addressed to the respective multicast group. The method may further comprise the mobile device entering a Doze state based at least in part on the schedule information, and exiting the Doze state not later than the predicted start time for transmission of the one or more data frames addressed to the first multicast group.

In some embodiments of the preceding method, the beacon frame may further comprise a reference time; a multicast group address bitmap configured to indicate whether the beacon frame comprises schedule information for each defined multicast group; and multicast interval information indicating a time by which transmission of the data frames addressed to the plurality of multicast groups will cease. The respective schedule information for each respective multicast group of the plurality of multicast groups may comprise a respective multicast group address identifier configured to uniquely identify the respective multicast group; and a respective timing offset value indicating the respective predicted start time for transmission of the one or more data frames addressed to the respective multicast group relative to the reference time.

In some particular embodiments of the preceding methods, the method may further comprise the mobile device detecting, after the exiting the Doze state, a first data frame addressed to a second multicast group of the plurality of multicast groups, the second multicast group having a predicted start time before the predicted start time of the first multicast group, wherein the first data frame comprises timing information indicating a predicted remaining time for transmission of data frames addressed to the second multicast group. The method may further comprise the mobile device determining a new predicted start time for transmission of the one or more data frames addressed to the first multicast group, based on the timing information.

In some of the particular embodiments, the method may further comprise the mobile device entering a Doze state based at least in part on the new predicted start time, and exiting the Doze state not later than the new predicted start time.

In others of the particular embodiments, the method may further comprise the mobile device determining to not enter a Doze state based at least in part on the new predicted start time.

In yet others of the particular embodiments, wherein the new predicted start time is after a multicast interval identified in the beacon frame, and wherein the data frames addressed to the plurality of multicast groups are transmitted only during a multicast interval identified by a beacon frame, the method may further comprise the mobile device entering a Doze state based at least in part on the new predicted start time, and exiting the Doze state in time to receive a next beacon frame.

In some embodiments of any of the preceding methods, wherein the beacon frame and the plurality of multicast groups are transmitted by an access point, the method may further comprise the mobile device detecting, after the exiting the Doze state, that the access point does not transmit any frames for a length of time meeting a predetermined threshold length. The method may further comprise the mobile device entering a Doze state based at least in part on the detecting, and exiting the Doze state in time to receive a next beacon frame.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a mobile device may be configured to include means for performing steps according to one or more of the method embodiments described herein.

In some embodiments, a mobile device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing power management in a mobile device that is a member of a first multicast group, the method comprising:
by the mobile device:
receiving a first beacon frame comprising first schedule information for the first multicast group, wherein the first schedule information indicates a predicted start time for transmission of one or more data frames addressed to the first multicast group;
entering a Doze state a first time based at least in part on the first schedule information; and
exiting the Doze state not later than the predicted start time for transmission of one or more data frames addressed to the first multicast group;
detecting, after the exiting the Doze state, a frame addressed to a second multicast group, different than the first multicast group;
entering the Doze state a second time at least partly in response to the detecting the frame addressed to the second multicast group; and
exiting the Doze state in time to receive a second beacon frame;
receiving the second beacon frame, the second beacon frame comprising second schedule information for the first multicast group, the second schedule information comprising a new predicted start time for transmission of the one or more data frames addressed to the first multicast group.

2. The method of claim 1, wherein the beacon frame comprises schedule information for each of a plurality of multicast groups, the plurality of multicast groups comprising the first multicast group and the second multicast group, wherein the respective schedule information for each multicast group indicates a predicted start time for transmission of one or more data frames addressed to the respective multicast group.

3. The method of claim 2,
wherein the beacon frame further comprises:
a reference time; and
a multicast group address bitmap configured to indicate whether the beacon frame comprises schedule information for each defined multicast group; and
wherein the respective schedule information for each respective multicast group of the plurality of multicast groups comprises:
a respective multicast group address identifier configured to uniquely identify the respective multicast group; and
a respective timing offset value indicating the respective predicted start time for transmission of the one or more data frames addressed to the respective multicast group relative to the reference time.

4. The method of claim 1, wherein the second beacon frame is the next beacon frame following the first beacon frame.

5. The method of claim 1, further comprising:
receiving, after receiving the second beacon frame, the one or more data frames addressed to the first multicast group;
entering the Doze state after the receiving the one or more data frames addressed to the first multicast group; and
exiting the Doze state in time to receive a third beacon frame.

6. The method of claim 1, further comprising:
determining that the frame addressed to the second multicast group comprises timing information indicating a predicted remaining time for transmission of frames addressed to the second multicast group; and
determining, based on the timing information, that transmission of the one or more data frames addressed to the first multicast group will not occur within a multicast interval identified in the first beacon frame, wherein entering the doze state the second time is further in response to the determining that transmission of the one or more data frames addressed to the first multicast group will not occur within the multicast interval identified in the first beacon frame.

7. The method of claim 1, wherein the frame addressed to the second multicast group is detected within a window of time identified in the first beacon frame for transmission of the one or more data frames addressed to the first multicast group.

8. A non-transitory computer accessible memory medium comprising program instructions which, when executed at a mobile device, cause the mobile device to:
receive a first beacon frame comprising first schedule information for a first multicast group, the first multicast group comprising the mobile device, wherein the first schedule information indicates a predicted start time for transmission of one or more data frames addressed to the first multicast group;
enter a Doze state a first time based at least in part on the first schedule information; and
exit the Doze state not later than the predicted start time for transmission of one or more data frames addressed to the first multicast group;
detect, after the exiting the Doze state, a frame addressed to a second multicast group, different than the first multicast group;
enter the Doze state a second time at least partly in response to the detecting the frame addressed to the second multicast group; and
exit the Doze state in time to receive a second beacon frame;
receive the second beacon frame, the second beacon frame comprising second schedule information for the first multicast group, the second schedule information comprising a new predicted start time for transmission of the one or more data frames addressed to the first multicast group.

9. The non-transitory computer accessible memory medium of claim 8, wherein the beacon frame comprises schedule information for each of a plurality of multicast groups, the plurality of multicast groups comprising the first multicast group and the second multicast group, wherein the respective schedule information for each multicast group indicates a predicted start time for transmission of one or more data frames addressed to the respective multicast group.

10. The non-transitory computer accessible memory medium of claim 9,
wherein the beacon frame further comprises:
a reference time; and
a multicast group address bitmap configured to indicate whether the beacon frame comprises schedule information for each defined multicast group; and
wherein the respective schedule information for each respective multicast group of the plurality of multicast groups comprises:
a respective multicast group address identifier configured to uniquely identify the respective multicast group; and
a respective timing offset value indicating the respective predicted start time for transmission of the one or more data frames addressed to the respective multicast group relative to the reference time.

11. The non-transitory computer accessible memory medium of claim 8, wherein the second beacon frame is the next beacon frame following the first beacon frame.

12. The non-transitory computer accessible memory medium of claim 8, wherein the program instructions further cause the mobile device to:
receive, after receiving the second beacon frame, the one or more data frames addressed to the first multicast group;
enter the Doze state after the receiving the one or more data frames addressed to the first multicast group; and
exit the Doze state in time to receive a third beacon frame.

13. The non-transitory computer accessible memory medium of claim 8, wherein the program instructions further cause the mobile device to:
determine that the frame addressed to the second multicast group comprises timing information indicating a predicted remaining time for transmission of frames addressed to the second multicast group; and
determine, based on the timing information, that transmission of the one or more data frames addressed to the first multicast group will not occur within a multicast interval identified in the first beacon frame, wherein entering the doze state the second time is further in response to the determining that transmission of the one or more data frames addressed to the first multicast group will not occur within the multicast interval identified in the first beacon frame.

14. A mobile device, comprising:
at least one antenna configured to conduct communications on a wireless communication channel; and
wireless communication circuitry operably coupled to the at least one antenna, the wireless communication circuitry configured to:
receive a first beacon frame comprising first schedule information for a first multicast group, the first multicast group comprising the mobile device, wherein the first schedule information indicates a predicted start time for transmission of one or more data frames addressed to the first multicast group;
enter a Doze state a first time based at least in part on the first schedule information; and
exit the Doze state not later than the predicted start time for transmission of one or more data frames addressed to the first multicast group;
detect, after the exiting the Doze state, a frame addressed to a second multicast group, different than the first multicast group;

enter the Doze state a second time at least partly in response to the detecting the frame addressed to the second multicast group; and exit the Doze state in time to receive a second beacon frame;

receive the second beacon frame, the second beacon frame comprising second schedule information for the first multicast group, the second schedule information comprising a new predicted start time for transmission of the one or more data frames addressed to the first multicast group.

15. The mobile device of claim 14, wherein the beacon frame comprises schedule information for each of a plurality of multicast groups, the plurality of multicast groups comprising the first multicast group and the second multicast group, wherein the respective schedule information for each multicast group indicates a predicted start time for transmission of one or more data frames addressed to the respective multicast group.

16. The mobile device of claim 15,
wherein the beacon frame further comprises:
a reference time; and
a multicast group address bitmap configured to indicate whether the beacon frame comprises schedule information for each defined multicast group; and
wherein the respective schedule information for each respective multicast group of the plurality of multicast groups comprises:
a respective multicast group address identifier configured to uniquely identify the respective multicast group; and
a respective timing offset value indicating the respective predicted start time for transmission of the one or more data frames addressed to the respective multicast group relative to the reference time.

17. The mobile device of claim 14, wherein the second beacon frame is the next beacon frame following the first beacon frame.

18. The mobile device of claim 14, wherein the wireless communication circuitry is further configured to:
receive, after receiving the second beacon frame, the one or more data frames addressed to the first multicast group;
enter the Doze state after the receiving the one or more data frames addressed to the first multicast group; and
exit the Doze state in time to receive a third beacon frame.

19. The mobile device of claim 14, wherein the wireless communication circuitry is further configured to:
determine that the frame addressed to the second multicast group comprises timing information indicating a predicted remaining time for transmission of frames addressed to the second multicast group; and
determine, based on the timing information, that transmission of the one or more data frames addressed to the first multicast group will not occur within a multicast interval identified in the first beacon frame, wherein entering the doze state the second time is further in response to the determining that transmission of the one or more data frames addressed to the first multicast group will not occur within the multicast interval identified in the first beacon frame.

20. The mobile device of claim 14, wherein the frame addressed to the second multicast group is detected within a window of time identified in the first beacon frame for transmission of the one or more data frames addressed to the first multicast group.

* * * * *